United States Patent Office 3,118,257
Patented Jan. 21, 1964

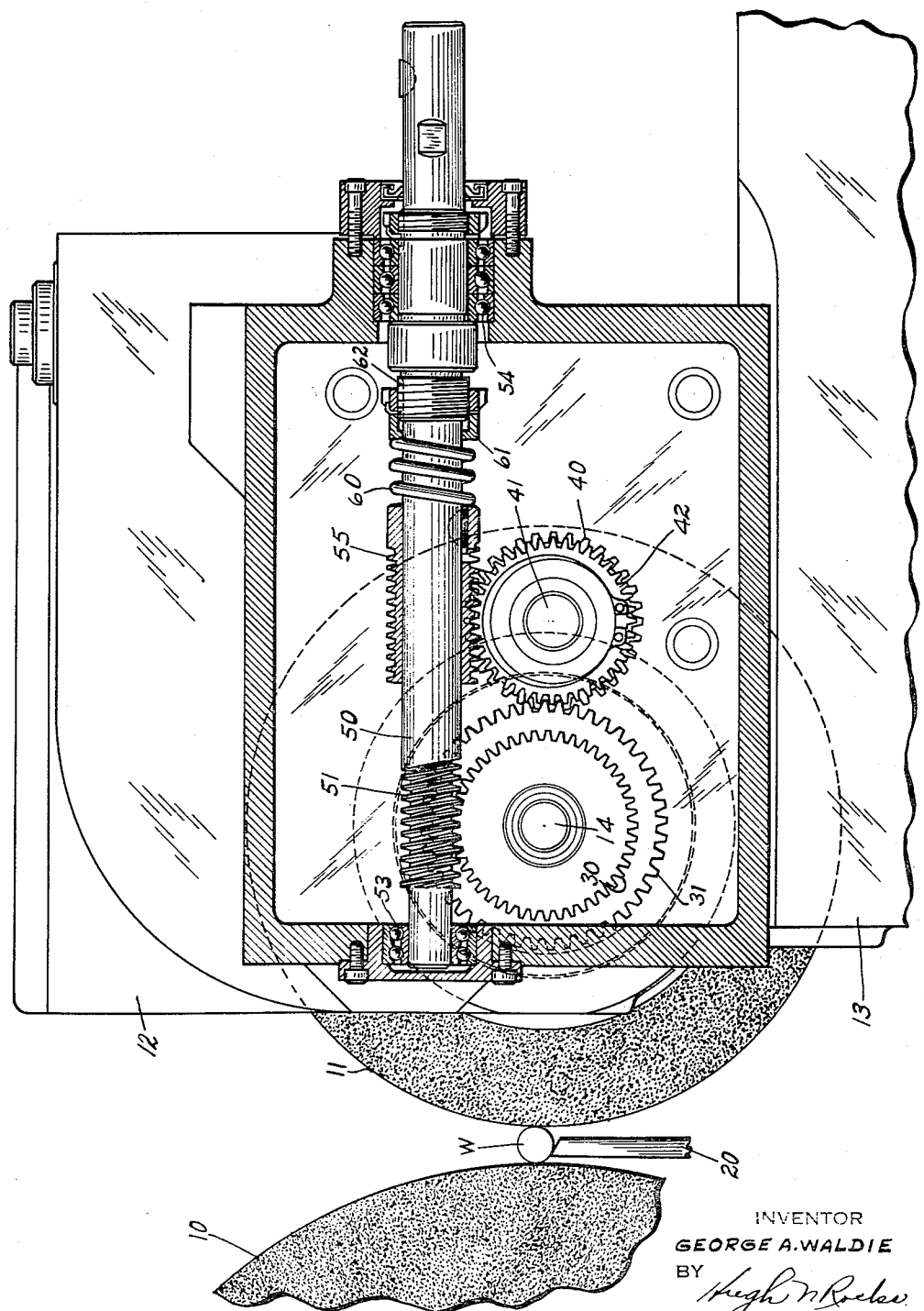

3,118,257
CENTERLESS CONTROL WHEEL DRIVE
George A. Waldie, Highfield, Md., assignor to Landis Tool Company, Waynesboro, Pa.
Filed June 29, 1962, Ser. No. 206,495
4 Claims. (Cl. 51—103)

The present invention relates to centerless grinding machines, particularly the control wheel drive for such machines.

The control wheel of a centerless grinder is subjected to a variable driving action by the grinding wheel operating through the workpiece. This driving action varies continuously because it is dependent upon the forces exerted by the grinding wheel through the workpiece against the control wheel. The forces exerted by the grinding wheel vary according to the depth of cut, condition of the wheel, etc.

In plunge grinding operations particularly, when the grinding wheel first engages the workpiece, it changes the driving conditions on the control wheel from being driven by a motor to being driven by the grinding wheel through the workpiece in the same direction as by the motor. Toward the end of the grinding operation, the force exerted by the grinding wheel becomes less and less as the cut becomes lighter so that at some unpredictable point in the grinding operation, the grinding wheel gradually ceases to exert sufficient force on the work to drive the control wheel. Then the control wheel drive motor gradually takes over. The effect of these changes in driving action between the grinding wheel and the control wheel is to cause a momentary change in the speed of rotation of the control wheel and the workpiece. The effect of these changes on the work is often to grind the work out of round.

It is, therefore, an object of the present invention to provide means for driving the control wheel which will not be affected by changing the grinding action of the grinding wheel on the workpiece.

Another object is to provide a worm and worm wheel drive combination in which one worm and worm wheel will drive the control wheel and another worm and worm wheel will serve as a regulator to prevent rotation of the control wheel beyond the predetermined speed at which said control wheel is driven by said first mentioned worm and worm wheel.

The drawing shows a partial sectional end view of a centerless grinder with means for rotating the control wheel.

Grinding wheel 10 is rotatably mounted on a grinding wheel support (not shown). Control wheel 11 is rotatably supported on control wheel support 12. Wheel support 12 is slidably mounted on bed 13 on spindle 14.

Work rest 20 supports workpiece W in position for grinding between grinding wheel 10 and control wheel 11.

On the end of spindle 14 is a worm wheel 30. Adjacent worm wheel 30 is a pinion 31 of larger diameter than worm wheel 30. Pinion 31 engages a smaller pinion 40 of different material on idler shaft 41. Worm wheel 42 is mounted on shaft 41 adjacent pinion 40.

Shaft 50 is rotatably mounted in bearings 53 and 54 in wheel support 12 and has a worm gear 51 formed thereon in operative relation with worm wheel 30. Worm gear 55 threaded oppositely to worm gear 51 is slidably mounted on shaft 50 for limited axial movement. Pressure is provided by spring 60 to urge worm gear 55 to the left. Spring 60 is loaded by means of collar 61 in threaded engagement with the threaded portion 62 on shaft 50. The driving action of worm gear 55 on shaft 50 is transmitted through worm wheel 42 which it rotates in a counter-clockwise direction, pinion 40 and pinion 31, to rotate spindle 14 in a clockwise direction. Rotation of spindle 14 is resisted by engagement of the teeth of worm wheel 30 on spindle 14 with worm gear 51 on shaft 50.

The driving force of worm gear 55 is supplemented by spring 60 to urge the teeth of worm wheel 30 against the threads of worm gear 51 which prevents an overhauling load from increasing the speed of control wheel 11. Control wheel 11 may rotate at a speed determined by the speed of worm gear 51.

I claim:

1. In a centerless grinding machine, a wheel support, a spindle rotatably mounted in said wheel support, a control wheel on said spindle, a worm wheel on said spindle, a worm gear in operative engagement with said worm wheel, a second worm gear in tandem relation with said first mentioned worm gear, and a connection between said second worm gear and said spindle.

2. In a centerless grinding machine, a wheel support, a spindle rotatably mounted in said wheel support, a control wheel on said spindle, a worm wheel on said spindle, a worm gear in operative engagement with said worm wheel, a second worm gear in tandem relation with said first mentioned worm gear, a connection between said second worm gear and said spindle including an idler shaft, a worm wheel and pinion on said idler shaft, said worm wheel and said second worm gear being in operative engagement, and a pinion on said spindle in operative engagement with said pinion on said idler shaft.

3. In a centerless grinding machine, a wheel support, a spindle rotatably mounted on said wheel support, a control wheel on said spindle, a worm wheel on said spindle, a shaft, a worm gear on said shaft in operative engagement with said worm wheel, a second worm gear on said shaft, and a connection between said second worm gear and said spindle.

4. In a centerless grinding machine, a grinding wheel, a control wheel, a control wheel support, a spindle for rotatably supporting said control wheel in said wheel support, a worm wheel on said spindle, a pinion adjacent said worm wheel, an idler shaft, a pinion on said idler shaft in operative engagement with said first mentioned pinion, a worm wheel on said idler shaft, a drive shaft having axially spaced worm gears thereon, one of said worm gears engaging the worm wheel on said spindle, the other of said worm gears engaging the worm wheel on said idler shaft, said other worm gear being slidably mounted on said drive shaft, and resilient means for urging said worm gear in the direction of said first mentioned worm gear.

References Cited in the file of this patent
UNITED STATES PATENTS

| | | |
|---|---|---|
| 2,872,757 | Ekholm | Feb. 10, 1959 |
| 2,913,854 | Ekholm | Nov. 24, 1959 |
| 3,054,227 | Price | Sept. 18, 1962 |